UNITED STATES PATENT OFFICE.

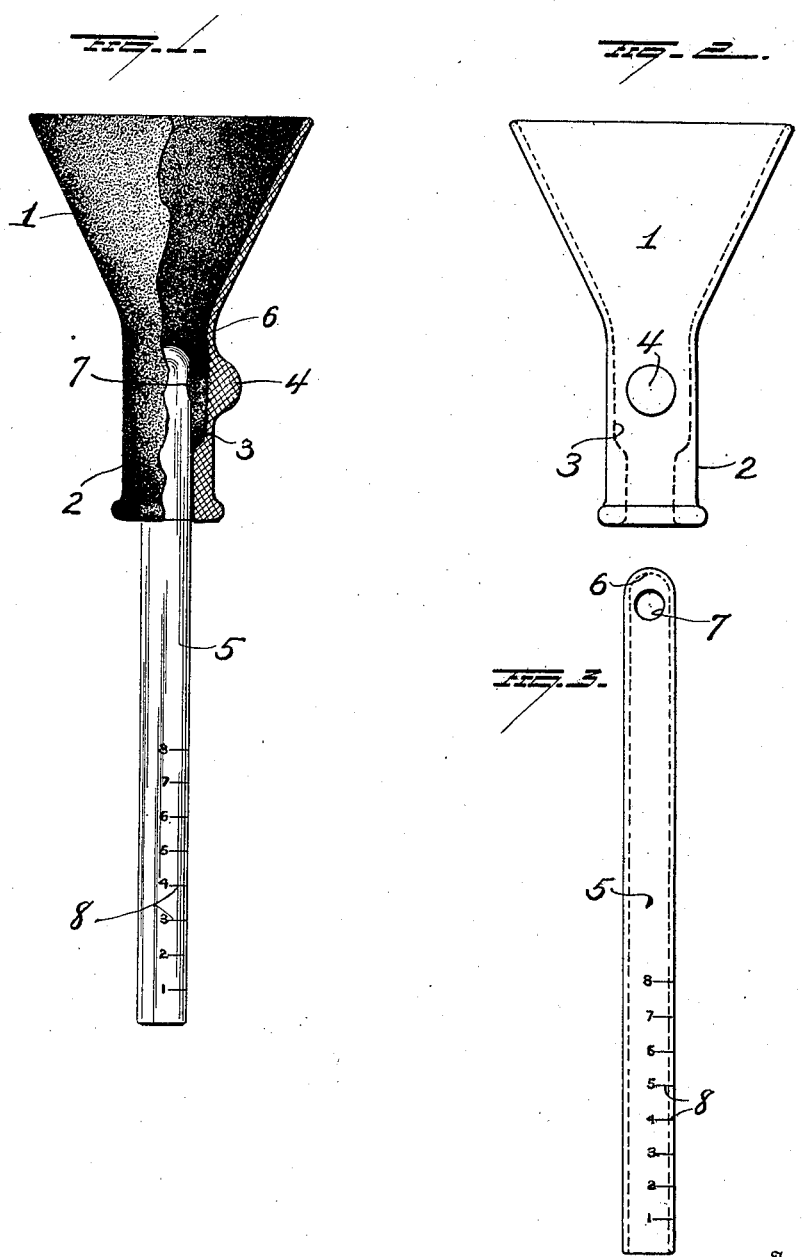

ADOLPH J. NUSS AND FREDRICK A. PARKER, OF WILLIAMSPORT, PENNSYLVANIA.

FILLING AND TESTING DEVICE.

1,399,868.

Specification of Letters Patent.   Patented Dec. 13, 1921.

Application filed March 23, 1921.   Serial No. 454,966.

*To all whom it may concern:*

Be it known that we, ADOLPH J. NUSS and FREDRICK A. PARKER, citizens of the United States, and residents of Williamsport, in the county of Lycoming and State of Pennsylvania, have invented certain new and useful Improvements in Filling and Testing Devices, and do hereby declare the following to be a full, clear, and exact description of the invention, such as will enable others skilled in the art to which it appertains to make and use the same.

This invention relates to an improved filling and testing device, and more particularly to such as is adaptable for use in filling storage batteries and testing the height of liquid therein over the plates.

One object of the invention is to provide a simple and efficient device of the character specified which shall be constructed of non-corrodible material and hence which will not be corroded or otherwise injured by the fluid of a storage battery.

A further object is to so construct a combined filling and testing device that it shall not be undesirably affected by or affect the liquid of a storage battery and which may be readily manipulated by the user to accomplish the purposes for which it is intended.

With these and other objects in view, the invention consists in certain novel features of construction and combinations of parts as hereinafter set forth and pointed out in the claims.

In the accompanying drawings, Figure 1 is a view partly in elevation and partly in section illustrating our improvements. Fig. 2 is a separate view of the funnel, and Fig. 3 is a separate view showing the tube portion of the device.

1 represents a funnel which may be made of rubber or other pliable material not injurious to the liquid of a storage battery and which will not be corroded or otherwise injured by said liquid. The funnel 1 is provided with an integral neck 2 having a chamber 3 formed therein. This neck is provided with an enlargement forming a button 4 whereby a portion of said neck may be readily depressed for a purpose hereinafter explained.

The upper end of a tube 5 of transparent material which will not be affected by and which will not affect the liquid of a storage battery is inserted into the neck portion 2 of the funnel so as to pass through the chamber 3. This tube may be made of glass and its upper end is closed as at 6 and below said closed upper end of the tube, the latter is made with an opening 7 directly opposite the button or enlargement 4. In order that the tube 5 may be retained in such position within the neck 2, it will preferably be secured in said neck by means of suitable cement. In this way the neck and tube will be prevented from turning relatively to each other and therefore the hole 7 in the tube will always be opposite the depressible button portion 4 of the neck. The lower end of the tube 5 is open and a portion of said tube is provided with suitable graduations 8 for denoting the height of liquid in the container.

In operating the device, the user must insert the tube 5 through an opening in the top of a storage battery cell and permit it to descend therein until it reaches the plane of the top edges of the battery plates. When the tube is thus inserted, battery liquid will enter the open lower end thereof and seek a level therein coincident with the level of the liquid in the battery. The user will then compress the neck portion 2 of the funnel by pressing against the button or enlargement 4 and thus close the opening 7 near the upper end of the tube. With the opening 7 thus closed, the user must remove the device from the battery cell and the liquid contained in the lower end of the tube will indicate the level of liquid in the battery cell or container. Should this level of liquid in the battery be lower than is desired, the user will replace the tube through the opening in the top of the cell and will then pour into the funnel a quantity of water (preferably distilled water) to bring the liquid in the battery cell to the desired level. It will of course be understood that when the water is poured into the funnel, the user will have released pressure on the button 4 and the water thus poured into the funnel will enter the chamber 3 in the neck 2 and from said chamber, flow through the opening 7 into and through the tube.

Having fully described our invention what we claim as new and desire to secure by Letters Patent, is:

1. A device of the character described, comprising a tube and a funnel to communicate therewith, said tube open at its lower end and provided near its upper end with a lateral opening, and means carried by the funnel and depressible to close said lateral opening near the upper end of the tube.

2. A device of the character described, comprising a funnel provided with a neck having a compressible portion and a tube entering said neck, said tube open at its lower end and closed at its upper end, and having a lateral hole near its upper end to be closed and opened by manipulation of the compressible portion of said neck.

3. A device of the character described, comprising a funnel provided with a neck having a chamber therein, said neck having a depressible button portion, and a tube entering said neck and closed at its upper end, said tube being open at its lower end and provided near its upper end within the chamber of the funnel neck with a lateral hole opposite the depressible button portion of said neck.

4. A device of the character described, the combination of a funnel of non-corrodible material and having a compressible neck portion of similar material, and a tube of non-corrodible material entering said neck portion and having a lateral opening, the upper end of said tube being closed and its lower end being open.

In testimony whereof, we have signed this specification in the presence of two subscribing witnesses.

ADOLPH J. NUSS.
FREDRICK A. PARKER.

Witnesses:
HELIS L. ALLEN,
JOHN W. McCALLUM.